(12) United States Patent
Sivaramakrishnan et al.

(10) Patent No.: US 11,907,034 B2
(45) Date of Patent: Feb. 20, 2024

(54) METHOD OF POWER MANAGEMENT FOR A HUB WITH A PLURALITY OF USB-C PORTS

(71) Applicant: Cypress Semiconductor Corporation, San Jose, CA (US)

(72) Inventors: Karthik Sivaramakrishnan, Bangalore (IN); Simon Abraham, Bangalore (IN); Manaskant Dipakkumar Desai, Bangalore (IN)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 17/841,256

(22) Filed: Jun. 15, 2022

(65) Prior Publication Data

US 2023/0409098 A1 Dec. 21, 2023

(51) Int. Cl.
*G06F 1/26* (2006.01)
*G06F 1/329* (2019.01)
*G06F 1/3234* (2019.01)

(52) U.S. Cl.
CPC .............. *G06F 1/266* (2013.01); *G06F 1/329* (2013.01); *G06F 1/3253* (2013.01)

(58) Field of Classification Search
CPC ......... G06F 1/266; G06F 1/3253; G06F 1/329
USPC .......................................................... 713/300
See application file for complete search history.

(56) References Cited

U.S. PATENT DOCUMENTS

| | | | | |
|---|---|---|---|---|
| 2004/0230846 | A1* | 11/2004 | Mancey | H04L 12/10 713/300 |
| 2015/0160674 | A1* | 6/2015 | Burdette | G06F 13/385 700/295 |
| 2016/0336745 | A1* | 11/2016 | Pandya | G06F 1/305 |
| 2021/0103539 | A1* | 4/2021 | Woodbury | G06F 1/266 |
| 2021/0208654 | A1* | 7/2021 | Bhattacharjee | H02J 1/106 |
| 2022/0221922 | A1* | 7/2022 | Polasa | G06F 1/3215 |
| 2022/0261055 | A1* | 8/2022 | Uchiyama | G06F 1/266 |
| 2022/0261056 | A1* | 8/2022 | Motoi | G09G 5/12 |
| 2022/0261369 | A1* | 8/2022 | Frederick | G06F 13/4282 |

OTHER PUBLICATIONS

Infineon Datasheet "Power delivery microcontroller Gen1", EZ-PD™ PMG1-S3, Mar. 16, 2022, pp. 1-67.

* cited by examiner

*Primary Examiner* — Chun Cao
(74) *Attorney, Agent, or Firm* — Murphy, Bilak & Homiller, PLLC (57) ABSTRACT

A method of power management for a hub having a plurality of Universal Serial Bus (USB)-C ports includes: allocating a guaranteed power budget to each USB-C port of the hub, wherein one of the USB-C ports has a higher power priority and the other USB-C ports have a lower power priority; reducing the guaranteed power budget allocated to a USB-C port with the lower power priority if measured power for that USB-C port is below its currently guaranteed power budget by a predetermined amount; and offering additional power budget to the USB-C port with the higher power priority if the guaranteed power budget allocated to a USB-C port with the lower power priority was previously reduced. Corresponding USB-Power Delivery (PD) integrated circuit (IC) controllers and hubs are also described.

22 Claims, 4 Drawing Sheets

METHOD OF POWER MANAGEMENT FOR A HUB WITH A PLURALITY OF USB-C PORTS

BACKGROUND

Multi-port Universal Serial Bus (USB)-Power Delivery (PD) systems such as USB-C docks provide power to a connected laptop as well as on-board devices and external peripherals. The power share for the laptop changes dynamically based on the connected and active peripherals. Power drawn by on-board devices also varies with data usage models. The optimum user experience requires effective usage of available power as well as sufficient power for all peripherals.

A conventional power management approach involves allocating power to each USB-PD (load) sink within a pre-defined MIN/MAX range. This approach suffers from limited power sharing to ports managed by a single USB-PD controller, does not consider power consumed by non-USB-PD components, and does not support power rebalancing between USB-PD ports. Another conventional power management approach involves equally splitting a fixed power reserve between multiple USB-PD sinks. However, this approach treats all ports as being equivalent and is targeted for chargers and does not consider power consumed by other components.

Thus, there is a need for an improved power management technique for multi-port USB-PD systems.

SUMMARY

According to an embodiment of a method of power management for a hub having a plurality of USB-C ports, the method comprises: allocating a guaranteed power budget to each USB-C port of the hub, wherein one of the USB-C ports has a higher power priority and the other USB-C ports have a lower power priority; reducing the guaranteed power budget allocated to a USB-C port with the lower power priority if measured power for that USB-C port is below its currently guaranteed power budget by a predetermined amount; and offering additional power budget to the USB-C port with the higher power priority if the guaranteed power budget allocated to a USB-C port with the lower power priority was previously reduced.

According to an embodiment of a hub, the hub comprises: a plurality of USB-C ports, wherein one of the USB-C ports has a higher power priority and the other USB-C ports have a lower power priority; and at least one Universal Serial Bus (USB)-Power Delivery (PD) integrated circuit (IC) controller configured to: allocate a guaranteed power budget to each USB-C port of the hub; reduce the guaranteed power budget allocated to a USB-C port with the lower power priority if measured power for that USB-C port is below its currently guaranteed power budget by a predetermined amount; and offer additional power budget to the USB-C port with the higher power priority if the guaranteed power budget allocated to a USB-C port with the lower power priority was previously reduced.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a power management technique for hubs having a plurality of USB-C ports. The power management technique enables fast charging of a laptop, laptop computer, notebook computer, or other type of portable personal computing device connected to a USB-C port of the hub, based on an active usage model. The power management technique incudes an algorithm that accounts for power consumed by on-board devices and non-USB-C ports. The power management technique also scales well as the number of ports increases.

The power management technique involves allocating a guaranteed power budget to each USB-C port of the hub, wherein one USB-C port has a higher power priority and the other USB-C ports have a lower power priority. For example, a laptop, laptop computer, notebook computer, or other type of portable personal computing device may be connected to the USB-C port with the higher power priority and peripheral devices such as monitor(s), printer(s), phone(s), storage device(s), security key(s), etc. may be connected to the USB-C ports with the lower power priority. The guaranteed power budget allocated to a USB-C port with the lower power priority is reduced if measured power for that USB-C port is below its currently guaranteed power budget by a predetermined amount. Additional power budget is offered to the USB-C port with the higher power priority if the guaranteed power budget allocated to a USB-C port with the lower power priority was previously reduced. The power management technique may include other aspects, depending on the end use application, such as including power budget allocation based on the activity of other hub devices (e.g., display port, thunderbolt port, etc.), use of 2 (or more) USB-PD controllers, etc.

Described next, with reference to the figures, are exemplary embodiments of the power management technique and corresponding Universal Serial Bus (USB)-Power Delivery (PD) integrated circuit (IC) controllers and hubs that implement the power management technique.

Figure 1:
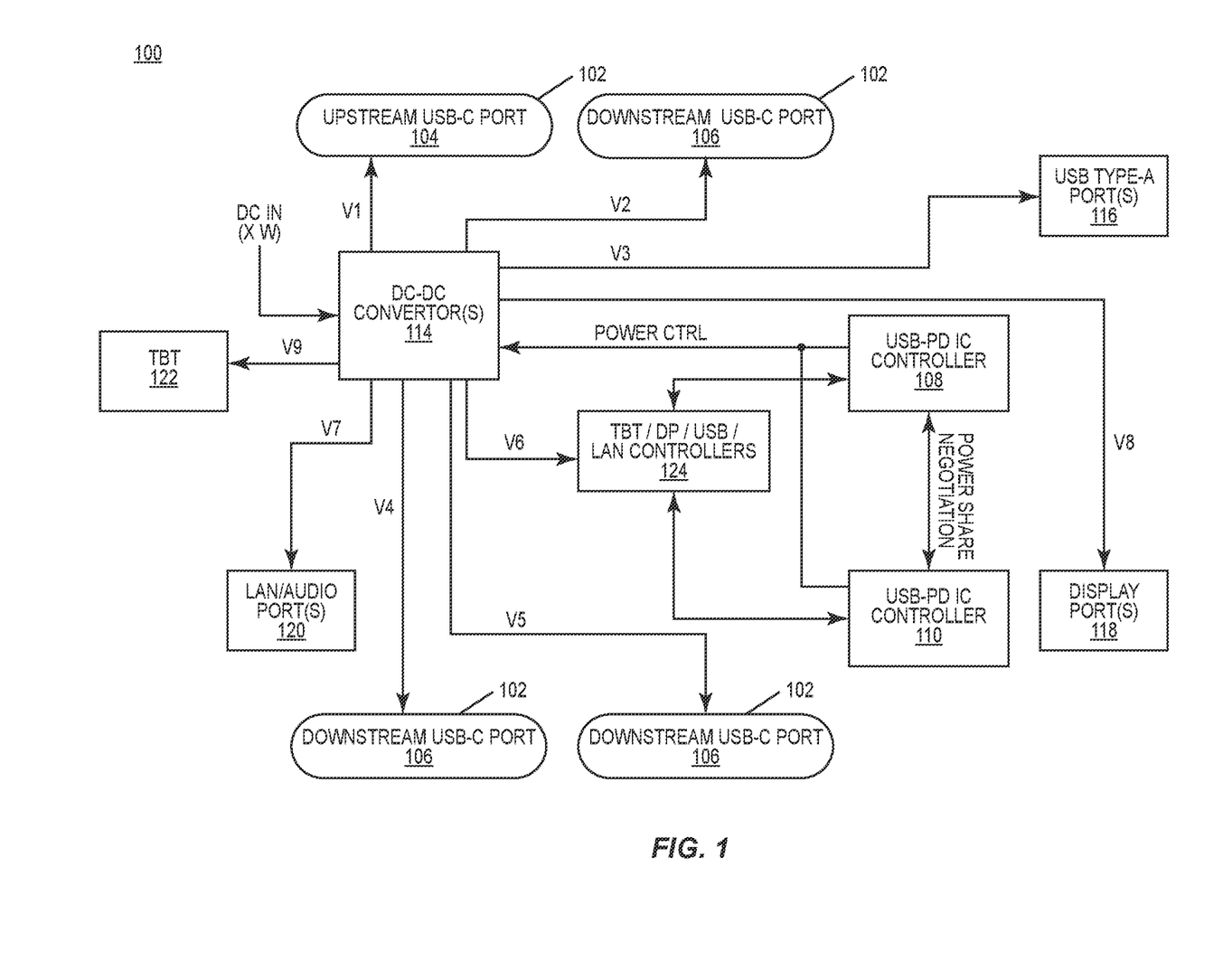
FIG. 1 illustrates a block diagram of an embodiment of a hub that includes a plurality of USB-C ports and at least one USB-PD IC controller that implements a power management technique.

FIG. 1 illustrates an embodiment of a hub 100. The term 'hub' as used herein refers to an electronic device that expands the number of ports for a laptop, laptop computer, notebook computer, or other type of portable personal computing device connected to the hub and that delivers power to the devices included in and connected to the hub. For example, the hub 100 may be a multi-port USB-PD dock or other type of docking station.

The hub 100 includes a plurality of USB-C ports 102. One ('Upstream') USB-C port 104 has a higher power priority and the other ('Downstream') USB-C ports 106 have a lower power priority. A laptop, laptop computer, notebook computer, or other type of portable personal computing device connects to the USB-C port 104 with the higher power priority and peripheral devices such as monitor(s), printer(s), phone(s), storage device(s), security key(s), etc. connect to the USB-C ports 106 with the lower power priority.

The hub 100 also includes at least one USB-PD IC controller 108, 110 that is compliant at least with the USB-PD base specification. The at least one USB-PD IC controller 108, 110 also may be compliant with a revision to the USB-PD base specification. The at least one USB-PD IC controller 108, 110 allocates a guaranteed power budget to each USB-C port 102 of the hub 100 and reduces the guaranteed power budget allocated to a USB-C port 106 with the lower power priority if measured power for that USB-C port 106 is below its currently guaranteed power budget by a predetermined amount. The at least one USB-PD IC controller 108, 110 offers additional power budget to the USB-C port 104 with the higher power priority if the guaranteed power budget allocated to a USB-C port 106 with the lower power priority was previously reduced.

In one embodiment, the hub 100 has a single USB-PD IC controller 108 that performs the power management technique described herein. According to this embodiment, the single USB-PD IC controller 108 may have at least two (2) USB-C ports 102 with one USB-C port 104 having a higher power priority than the other USB-C ports 106.

In the case of a 2-port USB-PD IC controller, the hub 100 may include a first USB-PD IC controller 108 and a second USB-PD IC controller 110. The first USB-PD IC controller 108 controls the USB-C port 104 with the higher power priority and one USB-C port 106 with the lower power priority. The second USB-PD IC controller 110 controls at least two other USB-C ports 106 with the lower power priority. More than two (2) USB-PD controllers may be used with each USB-PD controller controlling more than two (2) USB-C ports 102 and where the master USB-PD controller is managing the USB-C port 104 with the higher power priority and all other USB-C ports 106 are lower priority.

Figure 2:
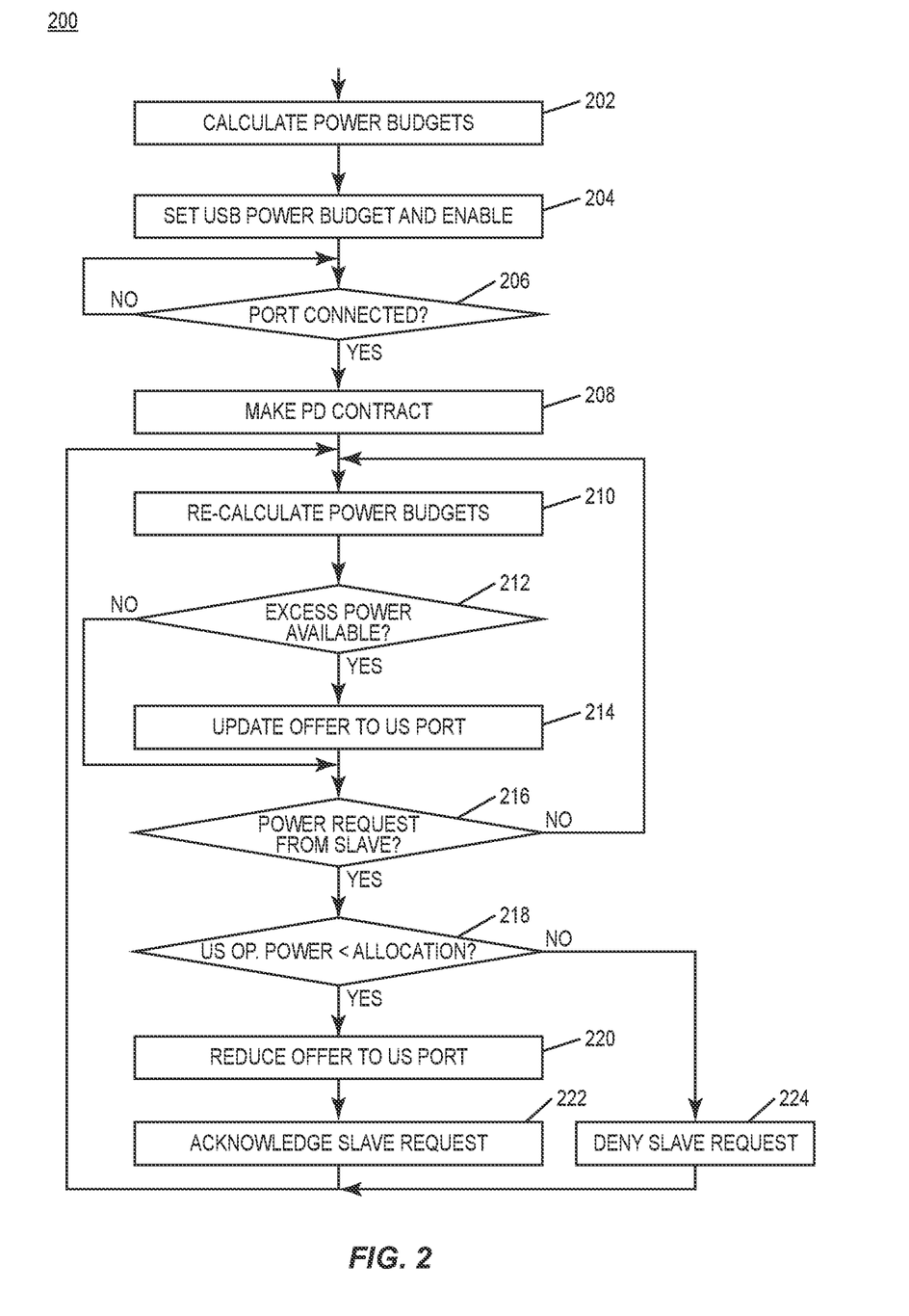
FIGS. 2 and 3 illustrate a flow diagram of an embodiment of the power management technique.
Figure 3:
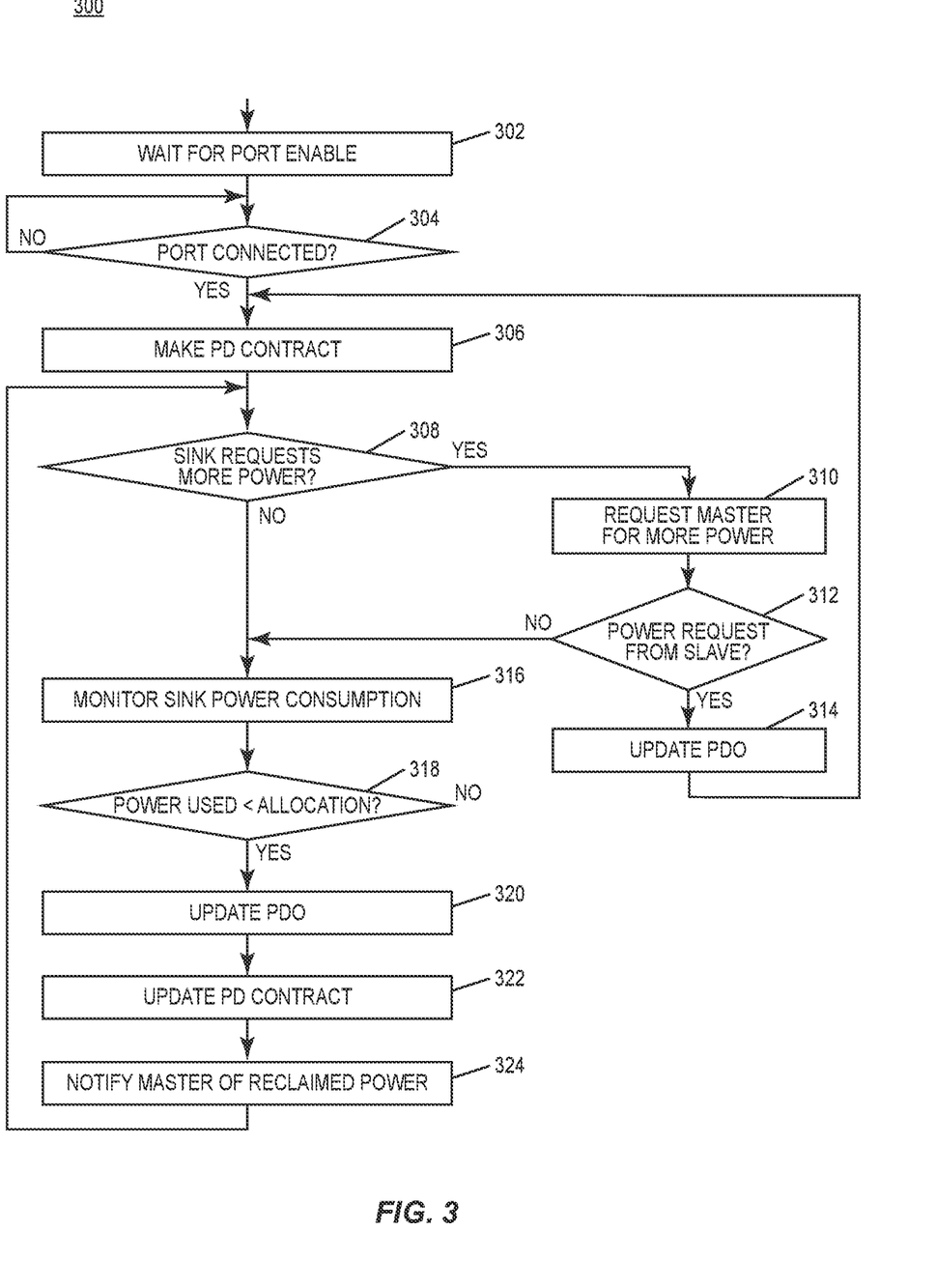

Under the classic master/slave model of asymmetric control, the first USB-PD IC controller 108 may be the master device and the second USB-PD IC controller 110 may be the slave device during the power share negotiation process, an embodiment of which is illustrated in FIGS. 2 and 3. The (master) first USB-PD IC controller 108 calculates all guaranteed power budgets for each USB-C port 102 of the hub 100. The (slave) second USB-PD IC controller 110 reduces the guaranteed power budget allocated to a USB-C port 106 controlled by the second USB-PD IC controller 110 if measured power for that USB-C port 106 is below its currently guaranteed power budget by a predetermined amount. The second USB-PD IC controller 110 communicates to the first USB-PD IC controller 108 each reduction of a guaranteed power budget allocated to a USB-C port 106 controlled by the second USB-PD IC controller 110. The first USB-PD IC controller 108 recalculates the guaranteed power budget allocated to at least one of the USB-C ports 102 of the hub 100 if the second USB-PD IC controller 110 communicates a guaranteed power budget reduction to the first USB-PD IC controller 108 and/or if the first USB-PD IC controller 108 reduces the guaranteed power budget allocated to a lower priority USB-C port 106 controlled by the first USB-PD IC controller 108. The first USB-PD IC controller 108 may offer additional power budget to the USB-C port 104 with the higher power priority if the guaranteed power budget allocated to a USB-C port 106 with the lower power priority was previously reduced.

Regardless of whether the hub 100 has a single USB-PD IC controller 108 or more than one USB-PD IC controller 108, 110 for implementing the power management technique, the power management technique ensures sharing of available power budget in an optimal manner at any given point in time to enable optimal charging of the device connected to the higher priority USB-C port 104. The total available power is fixed, e.g., based on the characteristics of a DC-DC convertor(s) 114 included in or connected to the hub 100. The DC-DC convertor(s) 114 converts a DC input voltage 'DC IN' to a corresponding voltage V1 through V9 regulated for each device or port coupled to the DC-DC convertor(s) 114, for delivering power to each of these entities.

Some power is kept in reserve but without overly limiting the charging of the device connected to higher priority USB-C port 104. Power management allocation is improved based on monitoring, e.g., using one or more USB-PD IC controllers 108, 110 included in the hub 100. A system-specific power reserve for on-board devices is not needed, because on-board component power requirements should not change. The hub 100 may also include additional hardware interfaces such as USB type-A port(s) 116 for older USB devices, display port(s) (DP) 118, local area network (LAN) and/or audio port(s) 120, Thunderbolt (TBT) ports 122, and related controllers 124. The DC-DC convertor(s) 114 powers each internal and external device. For example, the DC-DC convertor(s) 114 may deliver power at a regulated 5V to the USB-C and USB-A ports 102, 106, 3.3V to the related controllers 124, etc. The at least one USB-PD IC controller 108, 110 implements the power management technique via power control 'Power CTRL' signalling such as a PWM (pulse width modulation) signalling to the DC-DC convertor(s) 114, which adjusts the power provided to each component of the hub 100 accordingly.

The power management technique is described next in more detail with reference to FIGS. 2 and 3, where FIG. 2 depicts the part 200 of the power management algorithm implemented by the (master) first USB-PD IC controller 108 and FIG. 3 depicts the part 300 of the power management algorithm implemented by the (slave) second USB-PD IC controller 110. In the case of a single USB-PD IC controller 108 that performs the power management technique, the single USB-PD IC controller 108 implements both the part 200 of the power management algorithm shown in FIG. 2 and the part 300 of the power management algorithm shown in FIG. 3, except that the master/slave communication processes in FIGS. 2 and 3 are omitted in the single-controller case.

In either case, the power management algorithm shown in FIGS. 2 and 3 may be implemented in software and/or firmware, e.g., the power measurement on each USB-C port 102. For this purpose, the at least one USB-PD IC controller 108, 110 may include a current sense amplifier or similar circuitry for measuring the power delivered to each USB-C port 102 of the hub 100.

In FIG. 2, the first USB-PD IC controller 108 calculates a guaranteed power budget for each USB-C port 102, each USB-A port 116, each non-USB port 118, 122, 120, and each additional device 124 included in the hub 100 (Block 202). The guaranteed power budgets may be calculated based on an operating mode for the one or more additional devices 124 (e.g., thunderbolt, display port controller, LAN port controller, etc.), a fixed total power ('X W' in FIG. 1) available to the hub 100 from the DC-DC convertor(s) 114, and the number of ports 102, 116, 118, 122, 120.

The initial guaranteed power budget allocated to each USB-A port 116 of the hub 100 may be fixed, since USB-A ports 116 typically lack a mechanism to negotiate how much power the corresponding connected device requires. Separately or in combination, different power levels may be reserved for the USB-A ports 116. For example, 2.5 W may be guaranteed for each USB-2 type-A port, 4.5 W may be guaranteed for each USB-3 type-A port, 7.5 W may be guaranteed for each type-A power port that supports USB battery charging specification, etc.

The first USB-PD IC controller 108 may guarantee a system-specific power reserve for additional devices included in the hub 100 such as any controller(s) 124 (e.g., thunderbolt, display port controller, LAN port controller, etc.) for DP(s) 118, LAN and/or audio port(s) 120, TBT ports 122, etc. The level of guaranteed power for the additional devices may be defined and subsequently adjusted based on different types of operating modes (e.g., only USB data communication, display, thunderbolt 3, USB 4, etc.).

The first USB-PD IC controller 108 also allocates a guaranteed power budget to each USB-C port 102 of the hub 100 and enables the USB-C ports 102 at the corresponding initial guaranteed power budget (Block 204). For example, the USB-C ports 102 initially may have a 7.5 W power reserve but this amount may be adjusted during runtime as power demands change over time and the USB-C ports 102 may have different initial power budgets, e.g., the USB-C port 104 with the higher priority may have a larger initial guaranteed power budget compared to some or all of the USB-C ports 106 with a lower priority. Power also may be reclaimed from the USB-C port 104 with the higher priority. For example, as the charging level of the battery of the device connected to the higher priority USB-C port 104 increase, less power is needed to complete the charging. In this case, power budget may be reclaimed from the USB-C port 104 with the higher priority and reallocated to one or more USB-C port 106 with a lower priority and/or other devices included in the hub 100.

The first USB-PD IC controller 108 monitors it's USB-C ports 104, 106 to determine whether a device is connected to either port (Block 206). If a connected device is detected, a power delivery ('PD') contract procedure is performed via the corresponding USB-C port 104, 106 (Block 208). The power delivery contract procedure may include an exchange of power capabilities, based on the corresponding power budget previously determined for that port 104, 106.

Any of the connected devices and any of the internal devices of the hub 100 may request more power than what was initially allocated, and devices may be connected to the hub 100 and disconnected from the hub 100 over time. Such changes result in variable power demand, yet though the input power to the DC-DC convertor(s) 114 is typically fixed. Accordingly, the first USB-PD IC controller 108 may recalculate the guaranteed power budgets to more optimally deliver power to the internal hub devices and devices connected to the hub 100 (Block 210), with the USB-C port 104 having the higher priority given higher power reallocation priority compared to the USB-C ports 106 with a lower priority.

The first USB-PD IC controller 108 is aware of how much power currently is allocated to the devices connected to a lower priority USB-C ports 106, how much power the hub 100 is using, and what power requests were made by devices connected to the hub ports. The first USB-PD IC controller 108 may recalculate and determine whether the device connected to the USB port 104 with the higher priority should get more power or less.

If excess power is determined to be available (Block 212), the first USB-PD IC controller 108 may increase the power delivery offer to the USB-C port 104 with the higher priority (Block 214). For example, the guaranteed power budget allocated to the USB-C port 106 with the lower power priority may be reduced if the measured power for that USB-C port 106 is below its currently guaranteed power budget by a predetermined amount (e.g., by a certain percentage or by an absolute amount). The first USB-PD IC controller 108 may offer additional power budget to the USB-C port 104 with the higher power priority if the guaranteed power budget allocated to a USB-C port 106 with the lower power priority was previously reduced. In one embodiment, the first USB-PD IC controller 108 reduces the guaranteed power budget allocated to the USB-C port 106 with the lower power priority if the measured power for that USB-C port 106 is more than 50% below its currently guaranteed power budget.

Separately or in combination, the first USB-PD IC controller 108 may offer additional power budget to the USB-C port 104 with the higher power priority if the guaranteed power budget allocated to one or more additional devices included in the hub 100 was previously decreased. For example, the guaranteed power budget allocated to a controller 124 for a DP 118, LAN and/or audio port 120, TBT port 122, etc. may be reduced if the device connected to the corresponding port is disconnected or in a low power mode. In another example, the first USB-PD IC controller 108 can turn off power to the display controllers and ports if the first USB-PD IC controller 108 determines that the data connection with the higher priority USB-C port 104 is operating in a USB data only mode. Some or all power budget freed up from that controller 124 may be offered to the USB-C port 104 with the higher power priority.

The first USB-PD IC controller 108 may receive a power request from the second USB-PD IC controller 110 (Block 216). For example, a device connected to one of the lower priority USB-C ports 106 of the second USB-PD IC controller 110 may request more power and/or an additional device (e.g., controller 124) included in the hub 100 may request more power. If the measured power for the USB-C port 104 with the higher power priority is below its currently guaranteed power budget by a predetermined amount/allocation (Block 218), the first USB-PD IC controller 108 may decrease the power delivery offer to the USB-C port 104 with the higher priority (Block 220) and acknowledge the request for additional power from the second USB-PD IC controller 110 (Block 222). The first USB-PD IC controller 108 may recalculate the guaranteed power budgets in view of this power budget change (Block 210). If, however, the measured power for the USB-C port 104 with the higher power priority is within its currently guaranteed power budget by the predetermined amount (Block 218), the first USB-PD IC controller 108 denies the request from the second USB-PD IC controller 110 for additional power (Block 224).

In one embodiment, a request may be received to increase the guaranteed power budget allocated to a USB-C port 106 with the lower power priority. Whether to grant the request may be determined based on whether all power being consumed and delivered by the hub 100 is less than a fixed total power available to the hub 100, the fixed total power being provided by DC-DC convertor(s) 114 included in or connected to the hub 100. The request may be initially denied if all power being consumed and delivered by the hub 100 is at or within a predetermined margin of the fixed total power available to the hub 100. The request may be subsequently granted when all power being consumed and delivered by the hub 100 drops below the predetermined margin.

More generally, additional power may be allocated to a lower-priority device that requests more power if excess power budget is available or can be freed up and/or power budget may be reclaimed from a lower-priority device that uses less power than budgeted. Similarly, power may be reallocated for the device connected to the USB-C port 104 with the higher priority, with power increase requests from this device given higher priority than other devices included in or connected to the hub 100.

In FIG. 3, the second USB-PD IC controller 110 waits for its USB-C ports 106 to be enabled by the first USB-PD IC controller 108 (Block 302). The port enablement process is described above in connection with Block 204 of FIG. 2.

The second USB-PD IC controller 110 monitors each of its' lower-priority USB-C ports 106 to determine whether a device is connected (Block 304). If a connected device is detected, the second USB-PD IC controller 110 performs a power delivery ('PD') contract procedure via the corresponding port 106 (Block 306). The power delivery contract procedure may include an exchange of power capabilities, based on the corresponding power budget previously determined for that USB-C port 106.

If a device connected to one of the lower-priority USB-C ports 106 of the second USB-PD IC controller 110 requests more power (Block 308), the second USB-PD IC controller 110 sends a request for more power to the first USB-PD IC controller 108, e.g., using 120 communication (Block 310). If the first USB-PD IC controller 108 (grants) acknowledges the increase power request (Block 312), the second USB-PD IC controller 110 may increase the power delivery offer to the corresponding USB-C port 106 with a lower priority (Block 314). Otherwise, the second USB-PD IC controller 110 continues to monitor the power consumption of the devices connected to its lower-priority USB-C ports 106 (Block 316).

If the measured power for a device connected to one of the lower-priority USB-C ports 106 of the second USB-PD IC controller 110 is below its currently guaranteed power budget by a predetermined amount/allocation (Block 318), the second USB-PD IC controller 110 may reduce the guaranteed power budget allocated to the corresponding lower-priority USB-C port 106, update the corresponding power delivery offer (Block 320), and finalize a new power delivery contract for that port 106 (Block 322). In one embodiment, the second USB-PD IC controller 110 reduces the guaranteed power budget allocated to one of its USB-C ports 106 with the lower power priority if the measured power for that USB-C port 106 is more than 50% below its currently guaranteed power budget.

The second USB-PD IC controller 110 notifies the first USB-PD IC controller 108 of any reclaimed power (Block 324), e.g., by communicating to the first USB-PD IC controller 108 each reduction of a guaranteed power budget allocated to a USB-C port 106 controlled by the second USB-PD IC controller 110. The first USB-PD IC controller 108 may recalculate the guaranteed power budget allocated to at least one of the USB-C ports 102 of the hub 100 if the second USB-PD IC controller 110 communicates a guaranteed power budget reduction to the first USB-PD IC controller 108, e.g., as described in connection with Blocks 210 through 222 of FIG. 2. The communication processes represented by Blocks 216, 222, and 224 of FIG. 2 and by Blocks 302, 310, 312, and 324 of FIG. 3 may be omitted in the single-controller case of implementing power management technique.

Figure 4:
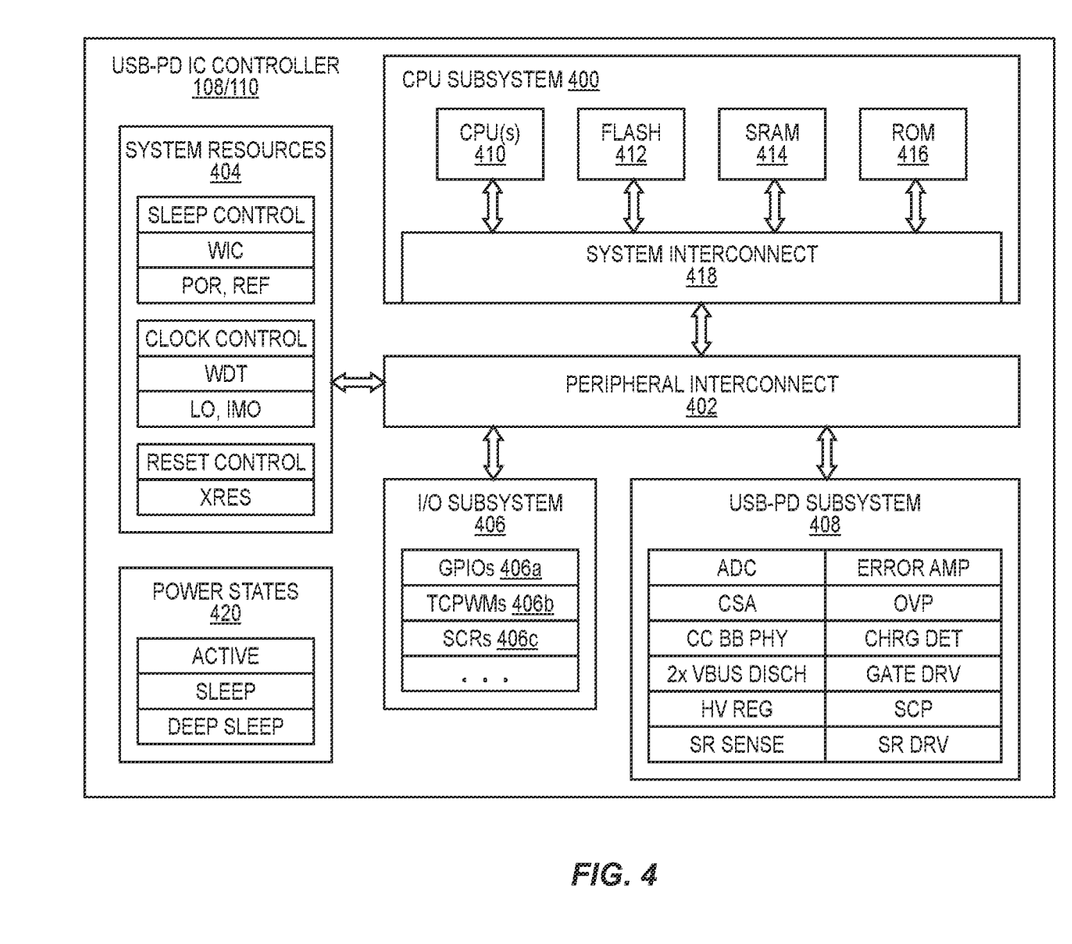
FIG. 4 illustrates a block diagram of an embodiment of a semiconductor device that is configured in accordance with the power management technique described herein.

FIG. 4 illustrates an example of a semiconductor device that is configured in accordance with the power management technique described herein. In the embodiment illustrated in FIG. 4, each USB-PD IC controller 108, 110 included in the hub 100 may be implemented as a single-chip IC controller manufactured on a semiconductor die. In another example, the USB-PD IC controller(s) 108, 110, the hub ports 102, 116, 118, 122, 120, and the additional hub devices 124 may be implemented as a single-chip IC that is manufactured as a System-on-Chip (SoC). In other embodiments, the USB-PD IC controller(s) 108, 110, the hub ports 102, 116, 118, 122, 120, and the additional hub devices 124 may be a multi-chip module encapsulated in a single semiconductor package.

Referring to FIG. 4, each USB-PD IC controller 108, 110 included in the hub 100 includes a CPU (Central Processing Unit) subsystem 400, peripheral interconnect 402, system resources 404, input/output (I/O) subsystem 406, USB-PD subsystem 408, and various terminals (e.g., pins) that are configured for receiving and sending signals.

The CPU subsystem 400 includes one or more CPUs 410, flash memory 412, SRAM (Static Random Access Memory) 414, and ROM (Read Only Memory) 416 that are coupled to a system interconnect 418. Each CPU 410 is a suitable processor that can operate in an IC or a SoC device. The flash memory 412 is non-volatile memory (e.g., NAND flash, NOR flash, etc.) that is configured for storing data, programs, and/or other firmware instructions. The flash memory 412 is tightly coupled within the CPU subsystem 400 for improved access times. The flash memory 412 may include firmware instructions and/or other routines which, when executed by the CPU(s) 410, are configured to perform the operations of the power management techniques described herein (e.g., such as the operations described with respect to FIGS. 2, 3). Referring back to FIG. 4, the SRAM 414 is volatile memory that is configured for storing data and firmware instructions accessed by each CPU 410. The ROM 416 is read-only memory (or other suitable storage medium) that is configured for storing boot-up routines, configuration parameters, and other firmware parameters and settings. The system interconnect 418 is a system bus (e.g., a single-level or multi-level Advanced High-Performance Bus, or AHB) that is configured as an interface that couples the various components of the CPU subsystem 400 to each other, as well as a data and control interface between the various components of the CPU subsystem 400 and the peripheral interconnect 402.

The peripheral interconnect 402 is a peripheral bus (e.g., a single-level or multi-level AHB) that provides the primary data and control interface between the CPU subsystem 400 and its peripherals and other resources, such as the system resources 404, the I/O subsystem 406, and the USB-PD subsystem 408. The peripheral interconnect 402 may include various controller circuits (e.g., direct memory access, or DMA controllers), which may be programmed to transfer data between peripheral blocks without burdening the CPU subsystem 400. In various embodiments, each of the components of the CPU subsystem 400 and the peripheral interconnect 402 may be different with each choice or type of CPU, system bus, and/or peripheral bus.

The system resources 404 include various electronic circuits that support the operation of the USB-PD IC controller 108/110 in its various states and modes. For example, the system resources 404 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow the USB-PD IC controller 108/110 to draw and/or provide power from/to external sources with several different voltage and/or current levels and to support controller operation in several power states 420 (e.g., such as active state, sleep state, and a deep sleep state with clocks turned off). Further, in some embodiments the CPU subsystem 400 may be optimized for low-power operation with extensive clock gating and may include various internal controller circuits that allow the CPU subsystem 400 to operate in the various power states 420. For example, the CPU subsystem 400 may include a wake-up interrupt controller that is configured to wake the CPU subsystem 400 from a sleep state, thereby allowing power to be switched off when the IC chip is in the sleep state. The system resources 404 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. The system resources 404 may also include analog and/or digital circuit blocks that provide reset control and support external reset (XRES).

The I/O subsystem 406 includes several different types of I/O blocks and subsystems. For example, the I/O subsystem 404 includes GPIO (general purpose input output) blocks 406a, TCPWM (timer/counter/pulse-width-modulation) blocks 406b, and SCBs (serial communication blocks) 406c. The GPIOs 406a include analog and/or digital circuits configured to implement various functions such as, for example, pull-ups, pull-downs, input threshold select, input and output buffer enabling/disabling, multiplex signals connected to various I/O pins, etc. The TCPWMs 406b include analog and/or digital circuits configured to implement timers, counters, pulse-width modulators, decoders, and various other analog/mixed signal elements that are configured to operate on input/output signals. The SCBs 406c include analog and/or digital circuits configured to implement various serial communication interfaces such as, for example, 120 (Inter-Integrated Circuit), SPI (serial peripheral interface), UART (universal asynchronous receiver/transmitter), CAN (Controller Area Network) interface, CXPI (Clock eXtension Peripheral Interface), etc.

The USB-PD subsystem 408 provides the interface to the USB ports 102, 116 of the hub 100. As used herein, "USB-PD subsystem" refers to one or more logic blocks and other analog/digital hardware circuitry, which may be controllable by firmware and which is configured and operable to perform the functions and to satisfy the requirements specified in at least one release of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables (e.g., up to 5 A of current at up to 20V, for a total of up to 100 W of power). The USB-PD specification also defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging).

Among other circuitry, the USB-PD subsystem 408 may include: one or more analog-to-digital convertors (ADCs) for converting various analog signals to digital signals; an error amplifier (ERROR AMP) for controlling the power source voltage applied to a voltage bus A/BUS' line per a PD contract; a current sense amplifier (CSA) for measuring power at the USB-C ports 102 and providing over-current protection; an over-voltage protection (OVP) circuits for providing over-voltage protection on the VBUS line with configurable thresholds and response times; a charge detector logic block (CHRG DET) connected to the USB DP and DM lines for detecting conventional battery chargers conforming to various standard and proprietary battery charging specifications; at least one on-die discharge (VBUS DISCH) circuit that can discharge a VBUS line voltage to any of range of programmable voltage levels; one or more gate drivers (GATE DRV) for controlling the power switches that turn on and off the provision of power over the VBUS line; a high voltage regulator (HV REG) for converting the power supply voltage to the precise voltage (e.g., 3-5V) needed to power the USB-PD IC controller 108/110; a short circuit protection block (SCP) for additional short circuit detection across an external resistor coupled on the ground return path; and a SR sense logic block (SR SENSE) and a SR driver logic block (SR DRV) for implementing false negative sense (NSN) detection.

In accordance with the power management techniques described herein, the USB-PD subsystem 408 includes a communication channel (PHY) logic for supporting communications with the USB ports 102 and other devices of the hub 100. This includes communication channel logic for implementing the power management technique described herein.

Although the present disclosure is not so limited, the following numbered examples demonstrate one or more aspects of the disclosure.

Example 1. A method of power management for a hub having a plurality of USB-C ports, the method comprising: allocating a guaranteed power budget to each USB-C port of the hub, wherein one of the USB-C ports has a higher power priority and the other USB-C ports have a lower power priority; reducing the guaranteed power budget allocated to a USB-C port with the lower power priority if measured power for that USB-C port is below its currently guaranteed power budget by a predetermined amount; and offering additional power budget to the USB-C port with the higher power priority if the guaranteed power budget allocated to a USB-C port with the lower power priority was previously reduced.

Example 2. The method of example 1, wherein reducing the guaranteed power budget allocated to a USB-C port with the lower power priority comprises: reducing the guaranteed power budget allocated to a USB-C port with the lower power priority if measured power for that USB-C port is more than 50% below its currently guaranteed power budget.

Example 3. The method of example 1 or 2, further comprising: allocating a guaranteed power budget to one or more additional devices included in the hub; and adjusting the guaranteed power budget for the one or more additional devices based on an operating mode of the one or more additional devices.

Example 4. The method of example 3, wherein offering additional power budget to the USB-C port with the higher power priority comprises: offering additional power budget to the USB-C port with the higher power priority if the guaranteed power budget allocated to the one or more additional devices was previously decreased.

Example 5. The method of any of examples 1 through 4, further comprising: reducing the guaranteed power budget allocated to the USB-C port with the higher power priority if measured power for the USB-C port with the higher power priority is below its currently guaranteed power budget by a predetermined amount.

Example 6. The method of any of examples 1 through 5, wherein: the hub includes a first Universal Serial Bus (USB)-Power Delivery (PD) integrated circuit (IC) controller and a second USB-PD IC controller; the first USB-PD IC controller controls the USB-C port with the higher power priority and a USB-C port with the lower power priority; the second USB-PD IC controller controls at least two other USB-C ports with the lower power priority; the first USB-PD IC controller calculates all guaranteed power budgets for each USB-C port of the hub; and the second USB-PD IC controller reduces the guaranteed power budget allocated to a USB-C port controlled by the second USB-PD IC controller if measured power for that USB-C port is below its currently guaranteed power budget by a predetermined amount.

Example 7. The method of example 6, further comprising: communicating, from the second USB-PD IC controller to the first USB-PD IC controller, each reduction of a guaranteed power budget allocated to a USB-C port controlled by the second USB-PD IC controller.

Example 8. The method of example 7, further comprising: recalculating, by the first USB-PD IC controller, the guaranteed power budget allocated to at least one of the USB-C ports of the hub if the second USB-PD IC controller communicates a guaranteed power budget reduction to the first USB-PD IC controller.

Example 9. The method of any of examples 1 through 8, wherein the hub has at least one USB-A port and one or more additional devices included in the hub, the method further comprising: calculating the guaranteed power budget for each USB-C port, each USB-A port, and each additional device included in the hub based on an operating mode for the one or more additional devices, a fixed total power available to the hub, and the number of USB-C and USB-A ports, wherein the initial guaranteed power budget allocated to each USB-A port of the hub is fixed.

Example 10. The method of any of examples 1 through 9, further comprising: receiving a request to increase the guaranteed power budget allocated to a USB-C port with the lower power priority; and determining whether to grant the request based on whether all power being consumed and delivered by the hub is less than a fixed total power available to the hub.

Example 11. The method of example 10, further comprising: initially denying the request if all power being consumed and delivered by the hub is at or within a predetermined margin of the fixed total power available to the hub; and subsequently granting the request when all power being consumed and delivered by the hub drops below the predetermined margin.

Example 12. A hub, comprising: a plurality of USB-C ports, wherein one of the USB-C ports has a higher power priority and the other USB-C ports have a lower power priority; and at least one Universal Serial Bus (USB)-Power Delivery (PD) integrated circuit (IC) controller configured to: allocate a guaranteed power budget to each USB-C port of the hub; reduce the guaranteed power budget allocated to a USB-C port with the lower power priority if measured power for that USB-C port is below its currently guaranteed power budget by a predetermined amount; and offer additional power budget to the USB-C port with the higher power priority if the guaranteed power budget allocated to a USB-C port with the lower power priority was previously reduced.

Example 13. The hub of example 12, wherein the at least one USB-PD IC controller is configured to reduce the guaranteed power budget allocated to a USB-C port with the lower power priority if measured power for that USB-C port is more than 50% below its currently guaranteed power budget.

Example 14. The hub of example 12 or 13, wherein the at least one USB-PD IC controller is configured to: allocate a guaranteed power budget to one or more additional devices included in the hub; and adjust the guaranteed power budget for the one or more additional devices based on an operating mode of the one or more additional devices.

Example 15. The hub of example 14, wherein the at least one USB-PD IC controller is configured to offer additional power budget to the USB-C port with the higher power priority if the guaranteed power budget allocated to the one or more additional devices was previously decreased.

Example 16. The hub of any of examples 12 through 15, wherein the at least one USB-PD IC controller is configured to reduce the guaranteed power budget allocated to the USB-C port with the higher power priority if measured power for the USB-C port with the higher power priority is below its currently guaranteed power budget by a predetermined amount.

Example 17. The hub of any of examples 12 through 16, wherein: the at least one USB-PD IC controller includes a first USB-PD IC controller and a second USB-PD IC controller; the first USB-PD IC controller controls the USB-C port with the higher power priority and a USB-C port with the lower power priority; the second USB-PD IC controller controls at least two other USB-C ports with the lower power priority; the first USB-PD IC controller calculates all guaranteed power budgets for each USB-C port of the hub; and the second USB-PD IC controller reduces the guaranteed power budget allocated to a USB-C port controlled by the second USB-PD IC controller if measured power for that USB-C port is below its currently guaranteed power budget by a predetermined amount.

Example 18. The hub of example 17, wherein the second USB-PD IC controller is configured to communicate to the first USB-PD IC controller each reduction of a guaranteed power budget allocated to a USB-C port controlled by the second USB-PD IC controller.

Example 19. The hub of example 18, wherein the first USB-PD IC controller is configured to recalculate the guaranteed power budget allocated to at least one of the USB-C ports of the hub if the second USB-PD IC controller communicates a guaranteed power budget reduction to the first USB-PD IC controller.

Example 20. The hub of any of examples 12 through 19, further comprising: at least one USB-A port; and one or more additional devices, wherein the at least one USB-PD IC controller is configured to calculate the guaranteed power budget for each USB-C port, each USB-A port, and each additional device included in the hub based on an operating mode for the one or more additional devices, a fixed total power available to the hub, and the number of USB-C and USB-A ports, wherein the initial guaranteed power budget allocated to each USB-A port of the hub is fixed.

Example 21. The hub of any of examples 12 through 20, wherein the at least one USB-PD IC controller is configured to determine whether to grant a request to increase the guaranteed power budget allocated to a USB-C port with the lower power priority, based on whether all power being consumed and delivered by the hub is less than a fixed total power available to the hub.

Example 22. The hub of example 21, wherein: the at least one USB-PD IC controller is configured to initially deny the request if all power being consumed and delivered by the hub is at or within a predetermined margin of the fixed total power available to the hub; and subsequently grant the request when all power being consumed and delivered by the hub drops below the predetermined margin.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of power management for a hub having a plurality of USB-C ports, the method comprising:
    allocating a guaranteed power budget to each USB-C port of the hub, wherein one of the USB-C ports has a higher power priority and the other USB-C ports have a lower power priority;
    reducing the guaranteed power budget allocated to a USB-C port with the lower power priority in response to measured power for that USB-C port being below its currently guaranteed power budget by a predetermined amount; and
    offering additional power budget to the USB-C port with the higher power priority in response to the guaranteed power budget allocated to a USB-C port with the lower power priority having been previously reduced.

2. The method of claim 1, wherein reducing the guaranteed power budget allocated to a USB-C port with the lower power priority comprises:
    reducing the guaranteed power budget allocated to a USB-C port with the lower power priority in response to measured power for that USB-C port being more than 50% below its currently guaranteed power budget.

3. The method of claim 1, further comprising:
    allocating a guaranteed power budget to one or more additional devices included in the hub; and
    adjusting the guaranteed power budget for the one or more additional devices based on an operating mode of the one or more additional devices.

4. The method of claim 3, wherein offering additional power budget to the USB-C port with the higher power priority comprises:
    offering additional power budget to the USB-C port with the higher power priority in response to the guaranteed power budget allocated to the one or more additional devices having been previously decreased.

5. The method of claim 1, further comprising:
    reducing the guaranteed power budget allocated to the USB-C port with the higher power priority in response to measured power for the USB-C port with the higher power priority being below its currently guaranteed power budget by a predetermined amount.

6. The method of claim 1, wherein:
    the hub includes a first Universal Serial Bus (USB)-Power Delivery (PD) integrated circuit (IC) controller and a second USB-PD IC controller;
    the first USB-PD IC controller controls the USB-C port with the higher power priority and a USB-C port with the lower power priority;
    the second USB-PD IC controller controls at least two other USB-C ports with the lower power priority;
    the first USB-PD IC controller calculates all guaranteed power budgets for each USB-C port of the hub; and
    the second USB-PD IC controller reduces the guaranteed power budget allocated to a USB-C port controlled by the second USB-PD IC controller in response to measured power for that USB-C port i being below its currently guaranteed power budget by a predetermined amount.

7. The method of claim 6, further comprising:
    communicating, from the second USB-PD IC controller to the first USB-PD IC controller, each reduction of a guaranteed power budget allocated to a USB-C port controlled by the second USB-PD IC controller.

8. The method of claim 7, further comprising:
    recalculating, by the first USB-PD IC controller, the guaranteed power budget allocated to at least one of the USB-C ports of the hub in response to the second USB-PD IC controller communicating a guaranteed power budget reduction to the first USB-PD IC controller.

9. The method of claim 1, wherein the hub has at least one USB-A port and one or more additional devices included in the hub, the method further comprising:
    calculating the guaranteed power budget for each USB-C port, each USB-A port, and each additional device included in the hub based on an operating mode for the one or more additional devices, a fixed total power available to the hub, and the number of USB-C and USB-A ports,
    wherein the initial guaranteed power budget allocated to each USB-A port of the hub is fixed.

10. The method of claim 1, further comprising:
    receiving a request to increase the guaranteed power budget allocated to a USB-C port with the lower power priority; and
    determining whether to grant the request based on whether all power being consumed and delivered by the hub is less than a fixed total power available to the hub.

11. The method of claim 10, further comprising:
    initially denying the request in response to all power being consumed and delivered by the hub being at or within a predetermined margin of the fixed total power available to the hub; and
    subsequently granting the request when all power being consumed and delivered by the hub drops below the predetermined margin.

12. A hub, comprising:
a plurality of USB-C ports, wherein one of the USB-C ports has a higher power priority and the other USB-C ports have a lower power priority; and
at least one Universal Serial Bus (USB)-Power Delivery (PD) integrated circuit (IC) controller configured to:
allocate a guaranteed power budget to each USB-C port of the hub;
reduce the guaranteed power budget allocated to a USB-C port with the lower power priority if measured power for that USB-C port is below its currently guaranteed power budget by a predetermined amount; and
offer additional power budget to the USB-C port with the higher power priority if the guaranteed power budget allocated to a USB-C port with the lower power priority was previously reduced.

13. The hub of claim 12, wherein the at least one USB-PD IC controller is configured to reduce the guaranteed power budget allocated to a USB-C port with the lower power priority if measured power for that USB-C port is more than 50% below its currently guaranteed power budget.

14. The hub of claim 12, wherein the at least one USB-PD IC controller is configured to:
allocate a guaranteed power budget to one or more additional devices included in the hub; and
adjust the guaranteed power budget for the one or more additional devices based on an operating mode of the one or more additional devices.

15. The hub of claim 14, wherein the at least one USB-PD IC controller is configured to offer additional power budget to the USB-C port with the higher power priority if the guaranteed power budget allocated to the one or more additional devices was previously decreased.

16. The hub of claim 12, wherein the at least one USB-PD IC controller is configured to reduce the guaranteed power budget allocated to the USB-C port with the higher power priority if measured power for the USB-C port with the higher power priority is below its currently guaranteed power budget by a predetermined amount.

17. The hub of claim 12, wherein:
the at least one USB-PD IC controller includes a first USB-PD IC controller and a second USB-PD IC controller;
the first USB-PD IC controller controls the USB-C port with the higher power priority and a USB-C port with the lower power priority;
the second USB-PD IC controller controls at least two other USB-C ports with the lower power priority;
the first USB-PD IC controller calculates all guaranteed power budgets for each USB-C port of the hub; and
the second USB-PD IC controller reduces the guaranteed power budget allocated to a USB-C port controlled by the second USB-PD IC controller if measured power for that USB-C port is below its currently guaranteed power budget by a predetermined amount.

18. The hub of claim 17, wherein the second USB-PD IC controller is configured to communicate to the first USB-PD IC controller each reduction of a guaranteed power budget allocated to a USB-C port controlled by the second USB-PD IC controller.

19. The hub of claim 18, wherein the first USB-PD IC controller is configured to recalculate the guaranteed power budget allocated to at least one of the USB-C ports of the hub if the second USB-PD IC controller communicates a guaranteed power budget reduction to the first USB-PD IC controller.

20. The hub of claim 12, further comprising:
at least one USB-A port; and
one or more additional devices,
wherein the at least one USB-PD IC controller is configured to calculate the guaranteed power budget for each USB-C port, each USB-A port, and each additional device included in the hub based on an operating mode for the one or more additional devices, a fixed total power available to the hub, and the number of USB-C and USB-A ports,
wherein the initial guaranteed power budget allocated to each USB-A port of the hub is fixed.

21. The hub of claim 12, wherein the at least one USB-PD IC controller is configured to determine whether to grant a request to increase the guaranteed power budget allocated to a USB-C port with the lower power priority, based on whether all power being consumed and delivered by the hub is less than a fixed total power available to the hub.

22. The hub of claim 21, wherein:
the at least one USB-PD IC controller is configured to initially deny the request if all power being consumed and delivered by the hub is at or within a predetermined margin of the fixed total power available to the hub; and
subsequently grant the request when all power being consumed and delivered by the hub drops below the predetermined margin.

\* \* \* \* \*

UNITED STATES PATENT AND TRADEMARK OFFICE
CERTIFICATE OF CORRECTION

PATENT NO. : 11,907,034 B2
APPLICATION NO. : 17/841256
DATED : February 20, 2024
INVENTOR(S) : K. Sivaramakrishnan et al.

It is certified that error appears in the above-identified patent and that said Letters Patent is hereby corrected as shown below:

In the Claims

Column 14, Line 26 (Claim 6, Line 15), please change "port i being" to -- port being --.

Signed and Sealed this
Thirtieth Day of April, 2024

Katherine Kelly Vidal
*Director of the United States Patent and Trademark Office*